PATENTED JUL 27 1971
3,594,859
SHEET 1 OF 4
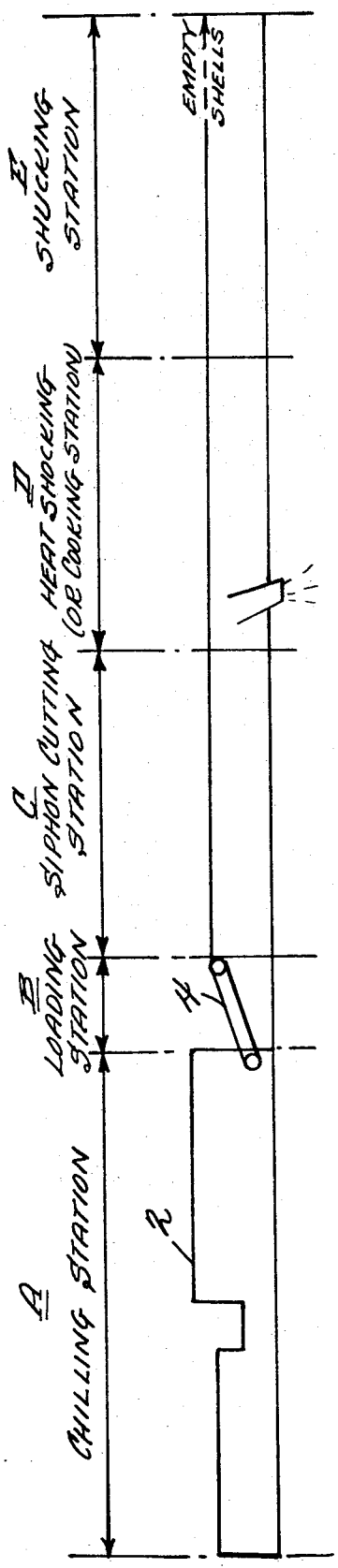
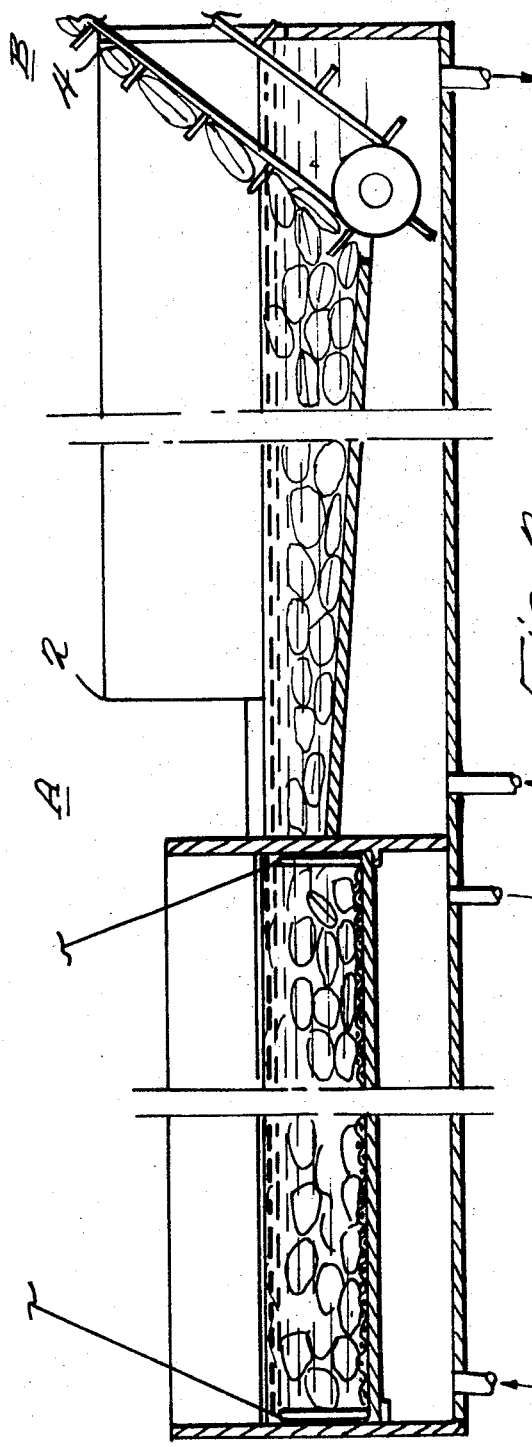
INVENTORS
FLETCHER HANKS, JR.
WILLIAM C. GRIEB, JR.
BY ROBERT U. GEIB, JR.
ATTORNEY

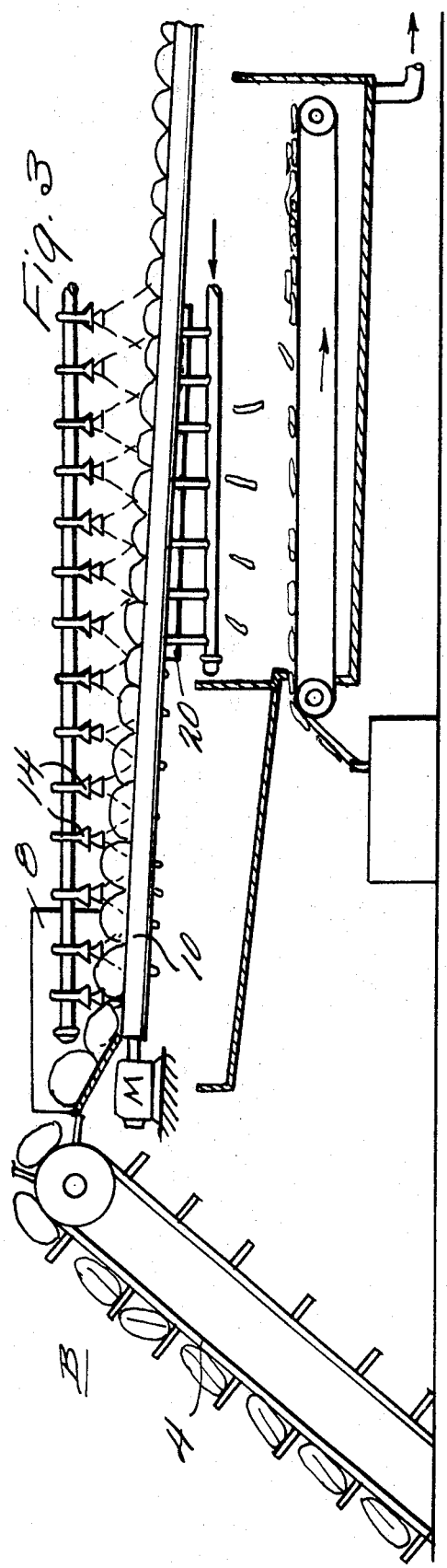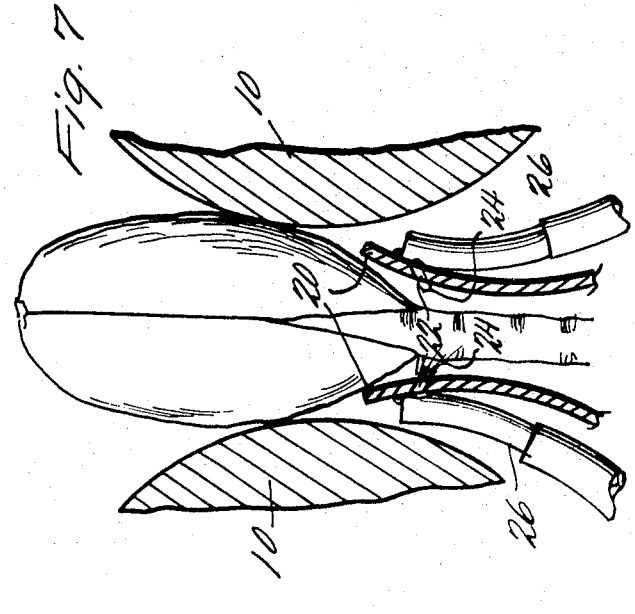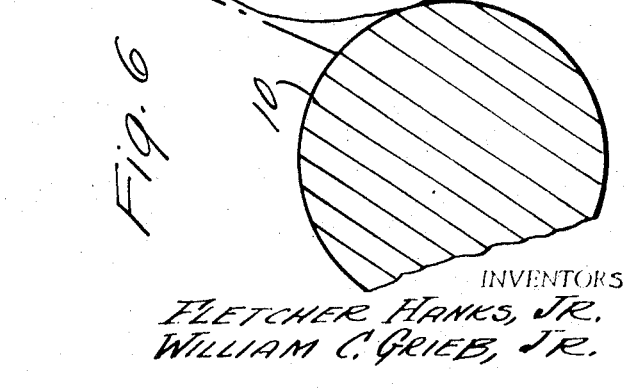

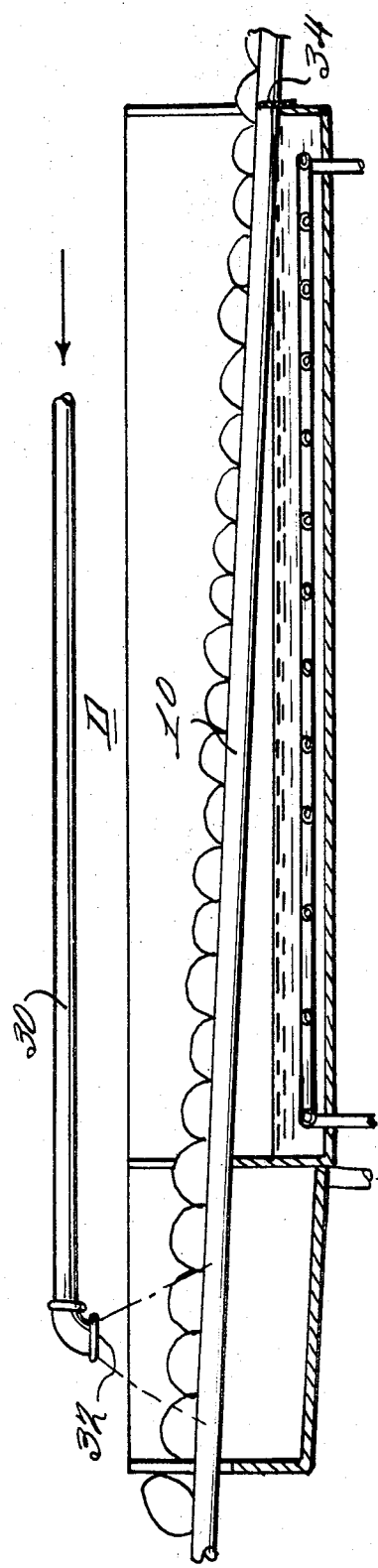
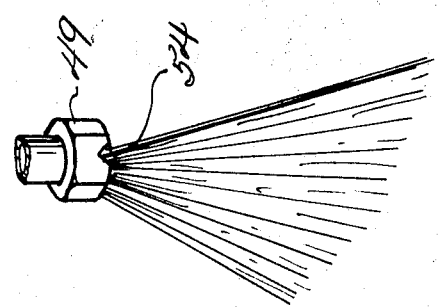
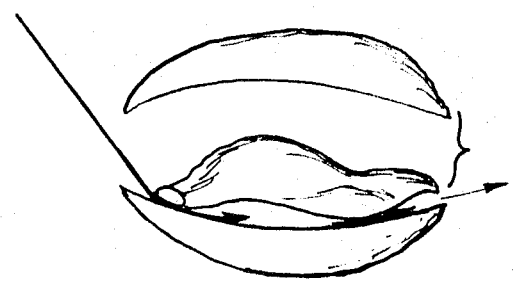
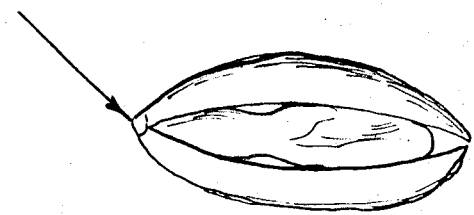
INVENTORS
FLETCHER HANKS, JR.
WILLIAM C. GRIEB, JR.
BY ROBERT U. GEIB, JR.
ATTORNEY

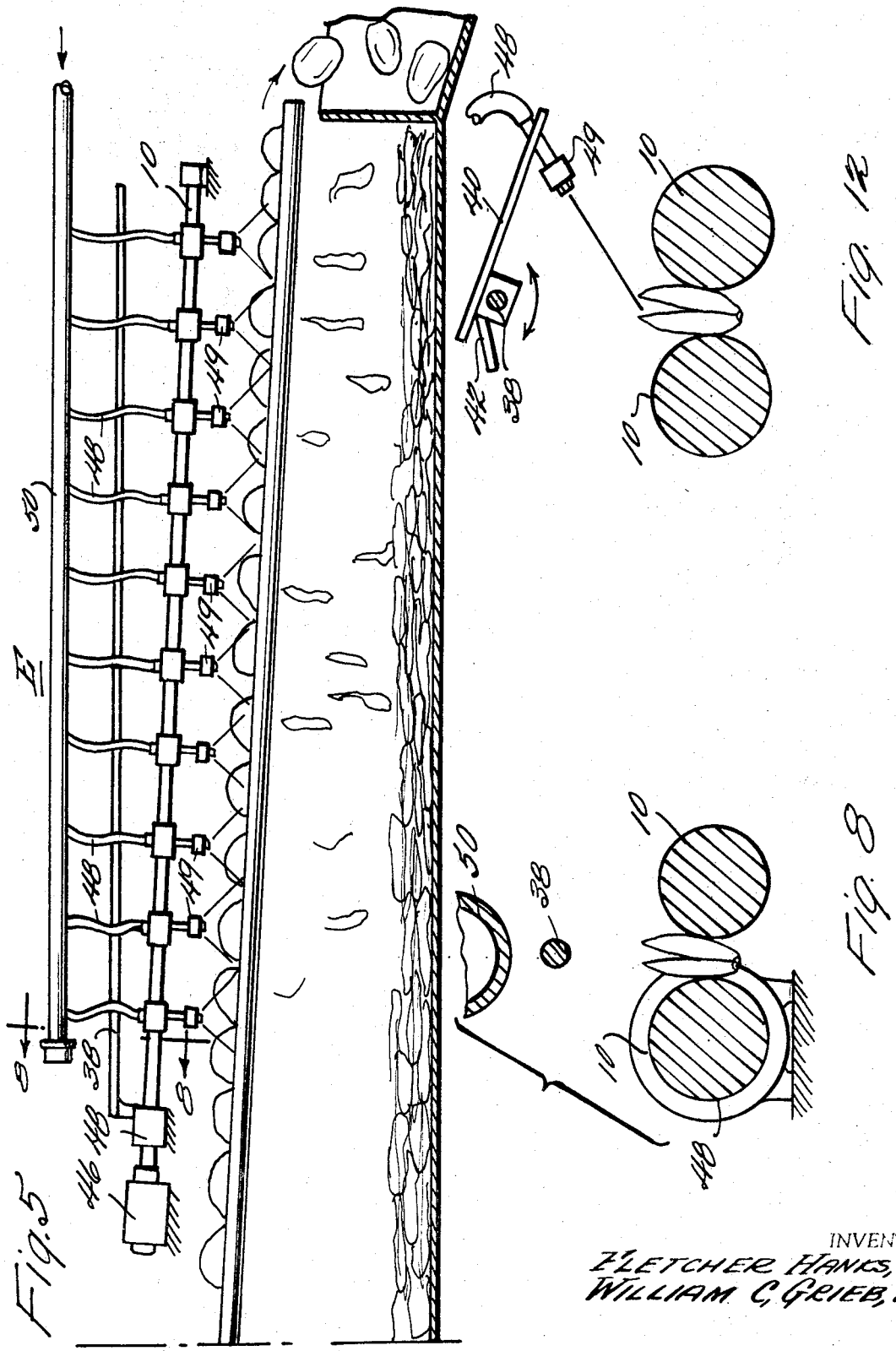

3,594,859

METHOD AND APPARATUS FOR REMOVING MEAT FROM THE SHELLS OF BIVALVE MOLLUSKS

Bivalve mollusks, such as clams, oysters, scallops and mussels, have two main shells or valves which are joined together by a hinge and held shut by adductor muscles which function to open and close the valves which, when open, pump in sea water containing food etc. One class of bivalve, which includes oysters and scallops, contains one adductor muscle and is known as monomyrian. Another class, which includes clams and mussels, contain two adductor muscles and is known as dimyrian.

When removed from the water the adductor muscle(s) of a bivalve mollusk becomes taut and pulls the two shells together against the force which is exerted by a ligament in the hinge.

The oldest method of removing the meat from the shells of bivalve mollusks, is, of course, the manual one of inserting a knife between the lips of the two shells and severing the adductor muscle from the shell and the ligament adjacent the hinge then opens the shell so that the meat can be removed; and it is well known that this method involves substantial skill and the application of considerable strength to the knife.

From the viewpoint of a processor of bivalve mollusks, for human consumption, there are two divisions of the species of bivalve mollusks; one division has a siphon that is tough and long enough to be removed (soft shell clams, goeducks and horse clams) and the other division has either no siphon or one which is too short to be removed (oysters, scallops, mussels, quahogs and skimmer clams).

Removing the meat from a bivalve mollusk which possesses a siphon of appreciable size requires another operation than is the case when removing the meat from a bivalve mollusk which is without the same.

It is among the objects of the present invention to provide a novel method and apparatus for efficiently removing the meat of bivalve mollusks from their shells without the use of hand labor and in such manner that the meat or flesh is undamaged and completely uncontaminated by sand or other impurities.

Another object is the provision of apparatus for effectively performing the method of the invention which is relatively simple and easy to manufacture, install, operate and maintain.

Still another object is the provision of an apparatus which possesses the foregoing characterstics and which operates rapidly and with but a minimum of manual effort and supervision.

A further object is the provision of an apparatus of the type described which may with relatively slight adjustment be changed from shucking soft shell clams of varying sizes and which are the division of bivalve mollusks with sizeable siphons to shucking oysters of varying sizes and which are of the division of the species of bivalve mollusks that do not have such siphons.

With the foregoing objects in view, together with others which will appear as the description proceeds, the invention resides in the novel combination of method steps, and in the novel construction, assemblage, and arrangement of parts, which will be described more fully in the discussion, illustrated in the drawings, and particularly pointed out in the appended claims. In the drawings:

FIG. 1 is a schematic elevational view illustrating the various stations, or areas, in the production line of the apparatus of the invention which may with relatively slight variation be very satisfactorily employed in the removal of the meat of bivalve mollusks of the different species described, and in either uncooked or cooked condition, FIG. 2 is an elevational view illustrating in greater detail the stations, or areas, wherein the bivalve mollusks in their shells (for example, clams or oysters) are satisfactorily chilled and moved therefrom by apparatus which loads the next station;

FIG. 3 is an elevational view of the station or area where the chilled clams or oysters are received from the loading station; and, in the case of clams immediately preparatory to having their siphons removed either whole or in part;

FIG. 4 is an elevational view of a heat-shocking station wherein the oysters or desiphoned clams are caused to further open their shells, said station being constructed and arranged to accomplish cooking if such is desired;

FIG. 5 is an elevational view of the shucking station which receives the oysters or clams (with their siphons cut off) and in either heat-shocked or completely cooked condition, and performs the actual shucking operation, whereby the meat of the bivalve mollusk is removed intact;

FIG. 6 is a transverse elevational view, partly in section and illustrating a clam which is moving through the apparatus in on-end position with its siphon extending downwardly preparatory to the removal thereof;

FIG. 7 is a schematic view illustrating more clearly the operation of the siphon-cutting station;

FIG. 8 is a transverse elevational view, partly in section, which is taken on the line 8–8 of FIG. 5;

FIGS. 9 and 10 are schematic views which progressively illustrate the manner of operation of the shucking station shown in FIG. 5;

FIG. 11 is a perspective view which illustrates in greater detail the jets of water which function to sever the adductor muscle of the clam, oyster or other shellfish from which the meat is to be removed and;

FIG. 12 is a detail view illustrating the manner in which the water jets shown in FIG. 10 are made to move in such manner as to follow the contour of the interior of the shell during the severing of the adductor muscle therefrom.

Referring more particularly to the drawings, the apparatus of the present invention includes the production line schematically represented in FIG. 1 which comprise A    CHILLING STATION
B    LOADING STATION
C    SIPHON CUTTING STATION (preliminary to shucking clams)
D    HEAT SHOCKING STATION (OR COOKING STATION) and
E    SHUCKING STATION together with means for moving the bivalve mollusks progressively therethrough.

CHILLING STATION—A

This station comprises a tank 2 containing water wherein the clams, or other shellfish are subjected to a chilling treatment while their siphons are extended in order to render them immobile during their movement through the Loading Station B and the Siphon Cutting Station C. Such chilling treatment is satisfactorily provided by immersion in water at approximately 35° F. for approximately 12 hours. However, it has been found beneficial to preliminarily place the clams in warm water, at approximately 80° F. which contains as little oxygen as possible. While in this bath, the clams should be placed as close together as possible in order that they take up all of the oxygen as possible. During this preliminary treatment of the clams they keep their siphons extended in search of oxygen; and due to the relative absence thereof they rapidly pass into a state of semisuffocation. Then, the chilling treatment of the clams with siphon extended is more effective to render them immobile during the time they are conveyed to, and move along, the rollers 10.

LOADING STATION—B

Any suitable conveying means, such as a conventional endless belt conveyor 4, may be utilized to move the chilled clams (with siphon extended) from the Chilling Station A to the upstream end of a hopper 6 as defined by a pair of spaced and downwardly convergent panels 8 which are disposed above the parallel, angularly declining, oppositely rotating rolls 10.

In the case of a clam, the siphon is at the end which is heaviest, and the widest point of the shell is past the center point on the opposite end. Because of this, the movement of clams in With such an arrangement the trajectory forms an inverted 90° angle; and the flat and fan-shaped or arcuate (as viewed in plan) spray pattern 54 is effectively directed into the shell of each individual clam or oyster from opposite sides thereof and so adjusted as to strike the shell along the contour of the inner face thereof and contacting the meat of the bivalve as little as possible.

The jets are arranged in successive sets with each set emitting progressively increased pressure so the more difficult shellfish to shuck will eventually reach jets of sufficient pressure to cut their adductor muscle and remove their meats.

From the drawings it will be perceived that all of the flat and fan-shaped or arcuate jets of water emanating from the nozzles 49 are offset; and that, due to the arrangement of alternately extending lateral arms 40 and 42 and the motion imparted by the oscillating shaft 38, said jets of water at point of impact follow the curvature of the contour of the inner face (s) of the shell and the meat of the clam (or oyster) falls by gravity between the rolls 10 and into a suitable collection facility; and the shells move forwardly along the rolls for ultimate disposal.

As stated, with the successive sets of nozzles delivering jets of water under progressively increased pressures, bivalve mollusks with adductor muscles which are more easily severable will be shucked before they have progressed into the Shucking Station E as far as those having adductor muscles which are more difficult to sever.

Due to variations in size, contour and weight distribution the various bivalve mollusks move along the forwardly feeding rolls 10 in varying posture (hinged portion upwardly or downwardly etc.) but the disposition and movement of the relatively large number of nozzles 49 in the Shucking Station C is such that no bivalve can progress therebeyond without having its adductor muscle completely severed and the meat removed intact.

The teachings of the invention also contemplate the substitution of a cluster of divergently disposed small round nozzles for each of the nozzles 49 on the alternately disposed arms 40 and 42 which extend laterally from the oscillating or rocking shaft (FIG. 12) 38.

According to the process described herein, together with the apparatus for practicing the same, substantially none of the meat of the clam or other bivalve mollusk remains on the shell, and the meat itself is guarded against shredding or other injury which would make it less marketable.

The present invention, therefore, is well adapted to carry out the objects and obtain the ends and advantages mentioned, as well as others inherent therein. While presently preferred embodiments of the invention have been given for the purpose of disclosure, numerous changes in the steps of the process and use of the process may be made which will readily suggest themselves to those skilled in the art and which are encompassed within the spirit of the invention and the scope of the appended claims.

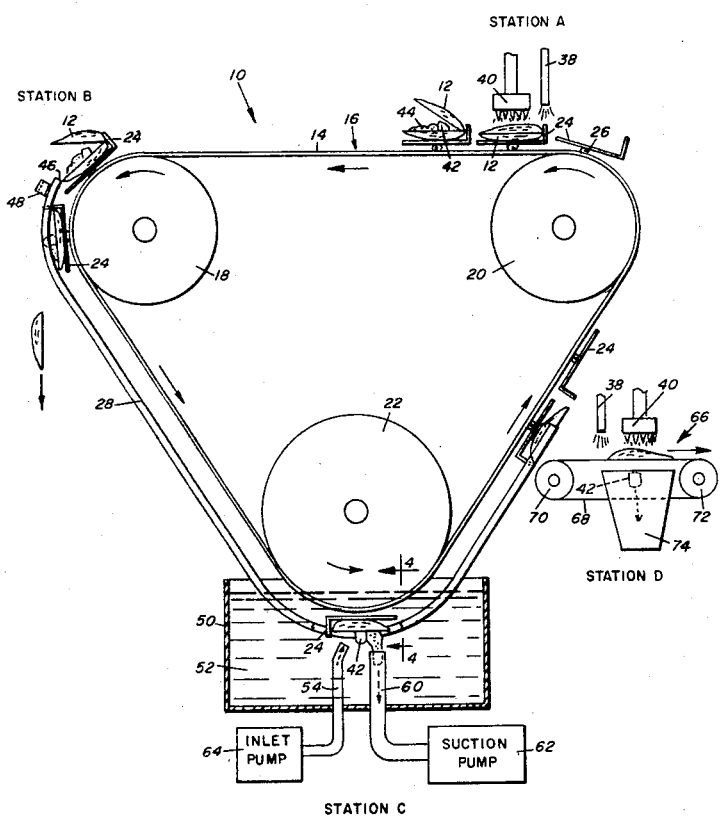

We claim:

1. The method of removing the meat from a bivalve mollusk which consists essentially of
    conditioning the bivalve mollusk in such manner that it is induced to at least partially open its shell;
    positioning the bivalve mollusk while its shell is partially open;
    directing into the partially open shell, and into close proximity to the adductor muscle of the bivalve mollusk, a jet of water which is at a pressure of between approximately 100 pounds per square inch and approximately 900 pounds per square inch, whereby the adductor muscle is severed from the shell
    and thereafter removing the meat of the bivalve mollusk intact.

2. The method of claim 1 wherein the jet of water is in the form of a relatively flat and arcuate spray which follows the curvature of the interior of the shell against which it is directed.

3. The method of claim 2 wherein there is a succession of relatively flat and arcuate sprays which are offset with respect to each other.

4. The method of removing the meat of species of bivalve mollusks with a siphon that is to be removed which consists essentially of
    conditioning the bivalve mollusk in such manner that it is induced to extend its siphon;
    positioning the bivalve mollusk while its shell is partially open in such manner that its siphon is downwardly extending;
    removing at least a portion of the siphon while the same is in downwardly extending position;
    repositioning the bivalve mollusk;
    directing into the partially open shell, and into close proximity to the adductor muscle of the bivalve mollusk, a jet of water which is at a pressure of between approximately 100 pounds per square inch and approximately 900 pounds per square inch whereby the adductor muscle is severed from the shell and thereafter removing the meat of the bivalve mollusk intact.

5. The method of claim 4 wherein said siphon is removed by the application of at least one jet of water under a pressure of between approximately 450 pounds per square inch and approximately 900 pounds per square inch.

6. The method of claim 4 wherein at least one spray of water under a pressure of between approximately 40 pounds per square inch and approximately 200 pounds per square inch is directed onto the upper portion of the bivalve mollusk during the removal of the portion of its siphon.

7. The method of removing the meat from a bivalve mollusk which consists essentially of
    conditioning the bivalve mollusk in such manner that it is induced to at least partially open its shell;
    positioning the bivalve mollusk, while its shell is at least partially open;
    directing into the partially open shell and into close proximity to the adductor muscle of the bivalve mollusk, a jet of water which is under sufficient pressure to sever the adductor muscle from the shell and thereafter
    removing the remainder of the meat of the bivalve mollusk intact.

8. The method of removing the meat of species of bivalve mollusks with a siphon that is to be removed which consists essentially of
    conditioning the bivalve in such manner that it is induced to extend its siphon;
    positioning the bivalve while its shell is partially open in such manner that its siphon is extending;
    directing onto a portion of the siphon of the bivalve a jet of water which is under sufficient pressure to cut therethrough and thereafter
    removing intact the remainder of the meat of the bivalve.

9. The method of removing the meat from a bivalve mollusk which consists essentially of
    chilling the bivalve mollusk sufficiently to cause it to partially open its shell;
    exposing the chilled bivalve mollusk to a source of heat which is sufficient to cause the bivalve mollusk to continue to open its shell to a point which is at least proximate the maximum opening of which it is capable and thereafter
    detaching the meat of the bivalve mollusk intact from its shell by the application of a water jet of sufficient pressure to that portion of the meat which is adjacent its point of connection with said shell.

10. The method of removing the meat from a bivalve mollusk which consists essentially of
    chilling the bivalve mollusk sufficiently to cause it to partially open its shell;
    exposing the chilled bivalve mollusk to a source of heat which is sufficient to cause the bivalve mollusk to continue to open its shell to a point which is at least proximate the maximum of which it is capable;

continuing the application of heat until the bivalve mollusk has been cooked and thereafter detaching the cooked meat of the bivalve mollusk intact from its shell by the application of a water jet of sufficient pressure to that portion of the meat which is adjacent its point of connection with said shell.

11. Apparatus for removing the meat from a bivalve mollusk which comprises means for conditioning the bivalve mollusk in such manner that it is induced to at least partially open its shell;

means for positioning the bivalve mollusk while its shell is partially open;

means for directing into the partially open shell, and into close proximity to the adductor muscle of the bivalve mollusk, a jet of water which is at a pressure of between approximately 100 pounds per square inch and approximately 900 pounds per square inch, whereby the adductor muscle is severed from the shell; and means for removing the meat of the bivalve mollusk intact.

12. Apparatus for removing the meat from a bivalve mollusk which comprises means for conditioning the bivalve mollusk in such manner that it is induced to at least partially open its shell;

means for positioning the bivalve mollusk while its shell is at least partially open;

means for directing into the partially opened shell of the bivalve mollusk, and into close proximity with its adductor muscle, a jet of water which is under sufficient pressure to sever the adductor muscle from the shell; and means for thereafter removing the remainder of the meat of the bivalve mollusk intact.

13. Apparatus for removing the meat from a species of bivalve mollusks with a siphon that is to be removed which comprises means for inducing the bivalve mollusk to extend its siphon;

means for positioning the bivalve mollusk in such manner that its siphon is downwardly extending means for cutting off at least a portion of the downwardly extending siphon;

means for repositioning the bivalve, and;

means for thereafter removing the remainder of meat of the bivalve intact.

United States Patent

[11] 3,594,860

| [72] | Inventors | Richard W. Nelson<br>Bothell;<br>Robert F. Mackin, Seattle; Wayne I.<br>Tretsven, Seattle, all of, Wash. |
|---|---|---|
| [21] | Appl. No. | 875,653 |
| [22] | Filed | Nov. 12, 1969 |
| [45] | Patented | July 27, 1971 |
| [73] | Assignee | The United States of America as represented by the Secterary of the Interior |

[54] METHOD FOR SHUCKING AND EVISCERATING BIVALVE MOLLUSKS
5 Claims, 4 Drawing Figs.

| [52] | U.S. Cl. | 17/48, 17/74 |
|---|---|---|
| [51] | Int. Cl. | A22c 29/00 |
| [50] | Field of Search | 17/48, 53, 54, 74 |

[56] References Cited
UNITED STATES PATENTS

| 3,203,034 | 8/1965 | Matzer et al. | 17/74 |
| 3,230,580 | 1/1966 | Marvin et al. | 17/48 |
| 3,239,876 | 3/1966 | Polito | 17/53 |
| 3,320,631 | 5/1967 | Brown | 17/74 |
| 3,473,191 | 10/1969 | Evans | 17/74 |

Primary Examiner—Lucie H. Laudenslager
Attorneys—Ernest S. Cohen and Albert A. Kashinski ABSTRACT: Bivalve mollusks are mechanically shucked and eviscerated in a continuous, automatic process. A burner severs one half-shell from the bivalve muscle, gaping the shell. The two half-shells are then physically separated and the remaining half-shell, with the muscle and viscera attached, is inverted in a water bath. Water jets strike the flesh, loosening the viscera from the muscle and shell. A suction pump ingests the viscera in a steadily flowing stream of water, thoroughly eviscerating the bivalve. Another burner then severs the muscle from the remaining half-shell.